United States Patent Office.

SPENCER BORDEN, OF FALL RIVER, MASSACHUSETTS.

Letters Patent No. 109,489, dated November 22, 1870.

IMPROVEMENT IN THE PREPARATION OF GARANCINE.

The Schedule referred to in these Letters Patent and making part of the same.

*To all whom it may concern:*

Be it known that I, SPENCER BORDEN, of the city of Fall River, in the county of Bristol and State of Massachusetts, have invented a certain new and useful Improvement in the Preparation of Garancine.

My invention consists in a certain novel treatment of garancine with a certain compound and chlorate of potash, by which the coloring-matter contained in the garancine is freely eliminated, resulting in a greater economy in its use, it is believed, than has heretofore been accomplished; and I do hereby declare the following specification to be a true, clear, and exact description thereof.

As a means of illustration, in order to compare my method of preparing garancine liquor with that in general use, I will present a common and usual dyers formula for producing certain effects well known to the art, the quantity stated being requisite for properly dyeing one yard of cloth, viz:

Eighteen drams garancine, eighteen drams garanceux, three drams sumac, two drams Persian berries, boiled with water to make three gallons of liquor.

After submitting goods to the action of the dye-bath they are cleared in the usual manner with "bran" and the "sours."

For producing substantially the same colors and effects with my improvement I use but, say, fifty-five per cent. of the quantity of garancine stated above, previously prepared as follows:

The garancine, say, ten drams, with one-quarter of its weight, or, say, two and a half drams of common hard soap, and two drams chlorate of potash are boiled in three quarts of water for, say, about thirty minutes, by the injection of steam in a well-known manner.

The quantity of liquid is then increased to one gallon by the addition of water.

It is then poured, with the eighteen drams garanceux, three drams sumac, and two drams of Persian berries which have previously been soaked in one gallon of water.

To this is then added water, raising the quantity of liquor to, say, three gallons, the whole being boiled by the injection of steam in the usual manner.

I have obtained satisfactory results by stirring mordanted goods for thirty minutes in the liquor at 120° Fahrenheit, raised to 140° Fahrenheit, continued for fifteen minutes, then raised to 180° Fahrenheit, and concluded in fifteen minutes, after which they are ready for the brans and "sours."

It is to be remembered that the dyers' formulas herein presented are merely for the purposes of illustration, and that they constitute no part of my invention, which relates wholly to the novel treatment of the garancine.

The proportions of hard soap and chlorate of potash, or their equivalents, may be varied with more or less desirable results without departing from the spirit of my invention.

Inasmuch as madder and garanceux are similarly affected by the compounding therewith of soap and chlorate of potash, an economy of, say, twenty-five per cent. will result by the use of the soap and chlorate, as described, applied and treated in substantially the same manner and proportions.

As uniform results are indispensable, I do not recommend the use of less than, say, seventy-five per cent. of the usual or normal quantity of madder or garanceux.

I am aware that soaps have heretofore been used in a great variety of application for the purposes of fixing and clearing colors derived from madder, garancine, and other similar dye-stuffs.

I am also aware that chlorate of potash and its equivalents have been used for similar purposes.

I am not, however, aware that both, or either of them, have ever, before my invention or discovery, been used singly or in combination in the preparation of dyeing liquors derived from garancine or other coloring-matter of its class; but that they have only been used in treating the mordanted goods after they had been subjected to the action of the dyeing-baths, prepared in the usual and well-known manner.

I do not, therefore, broadly claim as new the use of soaps or chlorate of potash, or their equivalents, for the purpose of developing coloring-matter already applied to mordanted goods, as my invention consists in treating the garancine by combining it with soap and chlorate of potash, or their well-known equivalents, by the chemical action of which the coloring-matter is fully eliminated from the fiber, resins, and gums contained therein, thereby developing, from a certain quantity of garancine, as much coloring-matter as has heretofore been obtained in the usual manner of its use from nearly double the said quantity.

Comparatively desirable results of a similar character may be attained by the separate use of either the soap or the chlorate of potash, in proportionately increased quantities; yet I prefer them combined, substantially as described, as thereby the same results are uniformly accomplished, and as the matter of economy, so far as the cost of the soap and chlorate is concerned, is of trifling consequence.

I therefore claim as new and desire to secure by Letters Patent—

The improvement in the treatment of garancine or other product of madder, which consists in eliminating the coloring-matter contained therein by the combined or separate action of hard soap and chlorate of potash, or their chemical equivalents, in the manner substantially as herein described.

SPENCER BORDEN.

Witnesses:
E. J. FRENCH,
CHAS. A. BENNETT.